United States Patent
Bronk

(10) Patent No.: US 10,103,889 B2
(45) Date of Patent: Oct. 16, 2018

(54) SECURELY EXCHANGING VEHICULAR SENSOR INFORMATION

(71) Applicant: INTEL CORPORATION, Santa Clara, CA (US)

(72) Inventor: Mateusz Bronk, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/771,096

(22) PCT Filed: Sep. 26, 2014

(86) PCT No.: PCT/PL2014/000107
§ 371 (c)(1),
(2) Date: Aug. 27, 2015

(87) PCT Pub. No.: WO2016/048177
PCT Pub. Date: Mar. 31, 2016

(65) Prior Publication Data
US 2017/0244565 A1   Aug. 24, 2017

(51) Int. Cl.
*H04L 9/32* (2006.01)
*H04L 9/14* (2006.01)
(Continued)

(52) U.S. Cl.
CPC .......... *H04L 9/3247* (2013.01); *B60R 16/023* (2013.01); *H04L 9/14* (2013.01);
(Continued)

(58) Field of Classification Search
CPC ...................................................... H04L 63/67
(Continued)

(56) References Cited

U.S. PATENT DOCUMENTS 5,387,923 A * 2/1995 Mattison .............. G09G 3/3611
345/103
5,734,858 A * 3/1998 Patrick ................ G06F 12/1081
711/2
(Continued)

OTHER PUBLICATIONS 5.1 Linear Address Space (Pub. Dt: Jul. 2003); "Toward Trusted Wireless Sensor Networks" Wen Hu et al., Pub. Dt: Aug. 2010.*
(Continued)

*Primary Examiner* — Taghi Arani
*Assistant Examiner* — Badri Champakesan
(74) *Attorney, Agent, or Firm* — Barnes & Thornburg, LLP

(57) ABSTRACT

Technologies for securely exchanging sensor information include an in-vehicle computing system of a vehicle to establish a trusted execution environment and a secure communication channel between the trusted execution environment and a corresponding trusted execution environment of a coordination server. A private key is bound to the trusted execution environment of the in-vehicle computing system. The in-vehicle computing system confirms the authenticity of the coordination server, receives sensor data generated by a sensor of the vehicle, and generates an attestation quote based on the trusted execution environment of the in-vehicle computing system. The in-vehicle computing system further transmits, to the coordination server over the secure communication channel, the sensor data, the attestation quote, and a cryptographically-signed communication signed with the private key.

21 Claims, 7 Drawing Sheets

(51) Int. Cl.
  *H04L 9/30* (2006.01)
  *H04L 29/06* (2006.01)
  *B60R 16/023* (2006.01)
  *H04L 29/08* (2006.01)

(52) U.S. Cl.
  CPC ............ *H04L 9/30* (2013.01); *H04L 63/0428* (2013.01); *H04L 67/141* (2013.01); *H04L 67/12* (2013.01); *H04L 2209/127* (2013.01); *H04L 2209/80* (2013.01); *H04L 2209/84* (2013.01)

(58) Field of Classification Search
  USPC .......................................................... 713/176
  See application file for complete search history.

(56) References Cited

U.S. PATENT DOCUMENTS

| | | | | |
|---|---|---|---|---|
| 8,832,461 | B2* | 9/2014 | Saroiu | G06F 21/53 455/456.3 |
| 9,124,421 | B2* | 9/2015 | Zhao | H04L 9/0819 |
| 9,185,626 | B1* | 11/2015 | Kunkel | H04W 40/02 |
| 9,349,287 | B1* | 5/2016 | Holzwanger | G08G 1/0133 |
| 9,405,283 | B1* | 8/2016 | Damico | G05B 19/0426 |
| 9,411,970 | B2* | 8/2016 | Saroiu | G06F 21/6209 |
| 9,769,854 | B1* | 9/2017 | Paczkowski | H04W 76/10 |
| 2004/0148481 | A1* | 7/2004 | Gupta | G06F 1/3225 711/165 |
| 2005/0060561 | A1* | 3/2005 | Pearson | G06F 21/57 713/194 |
| 2009/0086977 | A1* | 4/2009 | Berggren | H04L 9/3263 380/279 |
| 2011/0320823 | A1* | 12/2011 | Saroiu | G06F 21/53 713/189 |
| 2012/0130874 | A1* | 5/2012 | Mane | G06Q 30/04 705/34 |
| 2012/0265995 | A1* | 10/2012 | Kherani | H04L 9/3247 713/179 |
| 2012/0290847 | A1* | 11/2012 | O'Connor | H04L 9/3242 713/178 |
| 2013/0259234 | A1* | 10/2013 | Acar | H04L 9/0833 380/278 |
| 2014/0075496 | A1* | 3/2014 | Prakash | G06F 21/6218 726/1 |
| 2014/0095867 | A1* | 4/2014 | Smith | H04L 9/0822 713/164 |
| 2014/0181925 | A1* | 6/2014 | Smith | G06F 21/45 726/6 |
| 2014/0282868 | A1* | 9/2014 | Sheller | G06F 21/31 726/3 |
| 2014/0380057 | A1* | 12/2014 | Shi | H04L 63/062 713/171 |
| 2015/0135258 | A1* | 5/2015 | Smith | G06F 21/45 726/1 |
| 2015/0256534 | A1* | 9/2015 | Goudy | H04L 63/0823 713/156 |
| 2015/0264017 | A1* | 9/2015 | Saed | H04L 63/045 380/270 |
| 2015/0266377 | A1* | 9/2015 | Hampiholi | B60K 35/00 455/466 |
| 2015/0341332 | A1 | 11/2015 | Smith et al. | |
| 2015/0350176 | A1* | 12/2015 | Mabuchi | H04L 9/3271 726/6 |
| 2015/0358329 | A1* | 12/2015 | Noda | G06F 21/57 726/4 |
| 2015/0362997 | A1* | 12/2015 | Hatton | G06F 3/017 701/2 |
| 2016/0072781 | A1* | 3/2016 | Zhang | H04L 63/065 726/4 |
| 2016/0197797 | A1* | 7/2016 | Grotendorst | H04L 67/2828 370/465 |
| 2016/0197825 | A1* | 7/2016 | Grotendorst | G08G 1/093 370/392 |
| 2016/0261630 | A1* | 9/2016 | Benson | H04L 63/0838 |
| 2017/0286957 | A1* | 10/2017 | Wallaja | G06Q 20/401 |

OTHER PUBLICATIONS

"Online Certificate Status Protocol", downloaded from http://en.wikipedia.org/wiki/Online_Certificate_Status_Protocol, retrieved Apr. 24, 2014.
Wen Hu et al., "Toward Trusted Wireless Sensor Networks," ACM Transactions on Sensor Networks, vol. 7, No. 1, Aug. 2010, pp. 1-25.
International Search Report for International Application PCT/PL2014/000107, dated Jun. 9, 2015, 5 pages.
Written Opinion for International Application PCT/PL2014/000107, dated Jun. 9, 2015, 6 pages.

* cited by examiner

SECURELY EXCHANGING VEHICULAR SENSOR INFORMATION

CROSS REFERENCE TO RELATED APPLICATIONS

This application is a national stage entry under 35 USC § 371(b) of International Application No. PCT/PL2014/000107, which was filed Oct. 16, 2014.

BACKGROUND

Vehicle infotainment, navigation, and other in-vehicle computing systems have become commonplace in both luxury and low-end vehicles and can provide vehicle operators with a variety of driving assistance. For example, a vehicle-mounted camera system may be used for improved vision, automated parallel parking, and/or other purposes. Additionally, back-up sensors and/or automatic braking systems may be used to help prevent the driver from rear-ending pedestrians or other vehicles.

Vehicular communication systems have long enabled drivers and/or the vehicles themselves to communicate with support personnel for emergency and security responses. For example, some vehicles are able to self-report to emergency support personnel (i.e., at a remote location) when the vehicles are involved in an accident. Further, some vehicular communication systems enable the vehicle owner to contact security support personnel to, for example, unlock the vehicle should the owner inadvertently lock the keys in her car. The vehicle manufacturing industry has recently begun placing an emphasis on vehicular communication systems and concepts like autonomous cars and automated highways. In doing so, solutions have been developed to enable ad hoc vehicle-to-vehicle communication with very limited data security.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
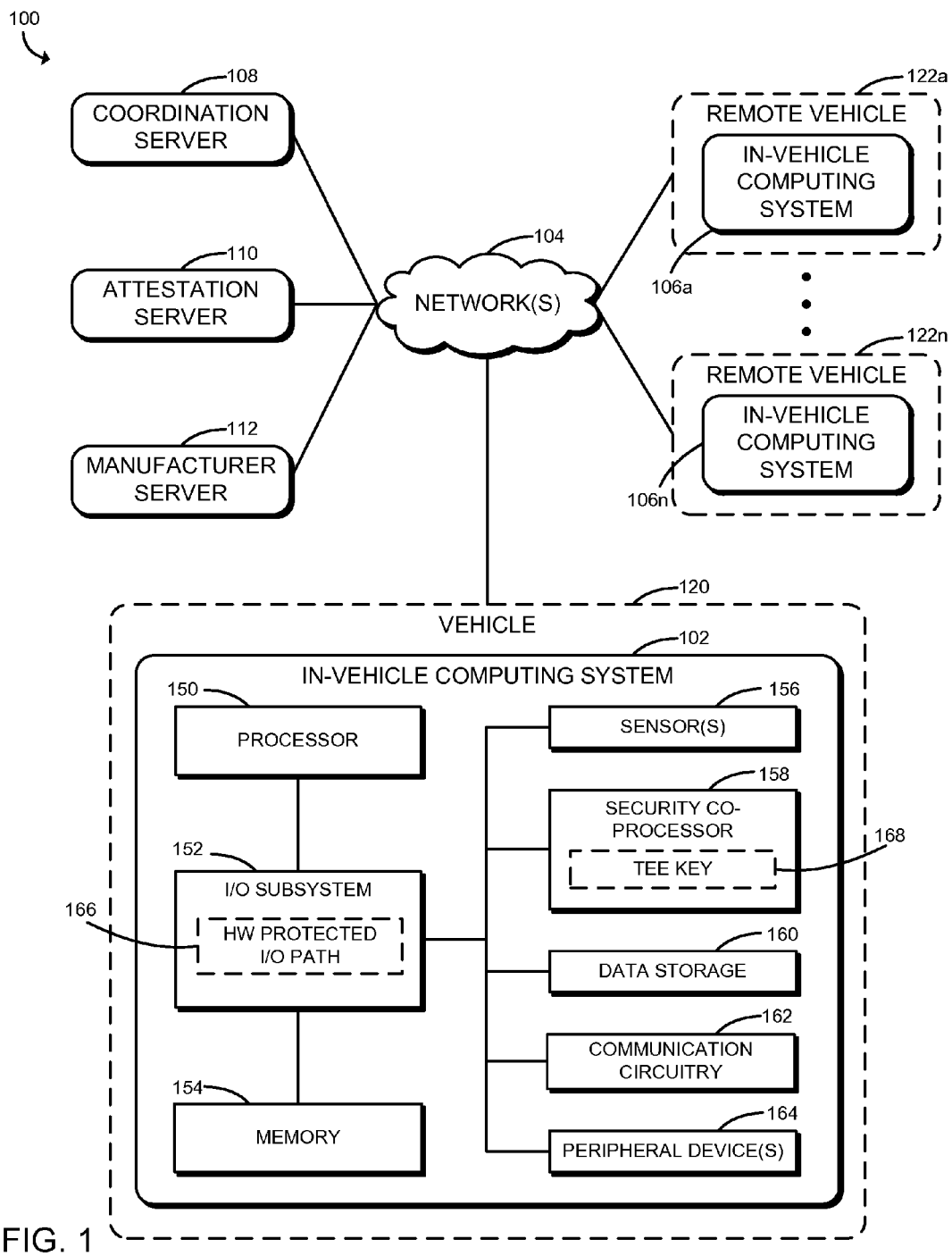
FIG. 1 is a simplified block diagram of at least one embodiment of a system for exchanging sensor information between vehicles.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for exchanging sensor information between vehicles includes an in-vehicle computing system 102, one or more networks 104, one or more remote in-vehicle computing systems 106, a coordination server 108, an attestation server 110, an a manufacturer server 112. As shown in FIG. 1, the in-vehicle computing system 102 is included in a vehicle 120 and each of the remote in-vehicle computing systems 106 is included in a corresponding remote vehicle 122. In the illustrative embodiment, each of the vehicles 120, 122 is embodied as a wheeled passenger vehicle (e.g., a car, truck, truck-tractor, bus, etc.). However, it should be appreciated that, in other embodiments, one or more of the vehicles 120, 122 may be embodied as another type of vehicle (e.g., as a rail-driven vehicle, aircraft, maritime vessel, unmanned vehicle, drone, or another vehicle suited for application of the described techniques and mechanisms) or other moveable apparatus.

Each of the in-vehicle computing systems 102, 106 may be embodied as any type of computing system capable of performing the functions described herein. Although only one coordination server 108, one attestation server 110, and one manufacturer server 112 are illustratively shown in FIG. 1, the system 100 may include any number of networks 104, coordination servers 108, attestation servers 110, and/or manufacturer servers 112 in other embodiments. For example, the system 100 may include a different manufacturer server 112 for each manufacturer of the vehicles 120, 122 included in the system 100. Further, in some embodiments, one or more of the devices of the system 100 may form a portion of another device of the system 100 (e.g., the manufacturer server 112 may be embodied as a portion of the coordination server 108).

As indicated above, vehicles 120, 122 may communicate with one another in a generally unsecure ad hoc manner using current in-vehicle computing systems. However, sensor data received by a vehicle in such systems could have been potentially transmitted over untrusted networks and/or be from a potentially hostile node. For example, in a simple collision avoidance system, inertial and spatial characteristics (e.g., speed, coordinates, etc.) of two vehicles may be communicated to one another to allow the vehicles to take protection action (e.g., stop the vehicle) in response to detecting a likely collision based on the received sensor data. In the unsecure systems described above, a miscreant could broadcast false or otherwise spoofed data to all nearby vehicles forcing them to identify a falsified imminent collision and to stop their travel. The system 100 permits the secure exchange of sensor information between vehicles in a way that protects against such malicious actions.

As described in detail below, the coordination server 108 coordinates the secure exchange of sensor information between the vehicle 120 and the remote vehicle(s) 106. In particular, the coordination server 108 establishes secure communication channels with one or more of the in-vehicle computing systems 102, 106. In the illustrative embodiment, the coordination server 108 and the in-vehicle computing system 102 attest the security of one another (e.g., through the attestation server 110) to verify that each of the coordination server 108 and the in-vehicle computing system 102 is executing instructions related to the transfer of sensor information in a trusted execution environment. After the security of the coordination server 108 has been verified, the in-vehicle computing system 102 may transfer sensor data to the coordination server 108. In doing so, the in-vehicle computing system 102 transmits the relevant sensor data, an attestation quote, and a trusted execution environment key signature (e.g., of the sensor data and/or the attestation quote) to the coordination server 108. As described below, the attestation quote may be based on the trusted execution environment of the in-vehicle computing system 102 (e.g., for verification by the coordination server 108), and the trusted execution environment key signature may be, for example, an Enhanced Privacy Identification (EPID) key signature generated with a private EPID key bound to the trusted execution environment of the in-vehicle computing system 102. Of course, as described below, other one-to-many cryptographic signatures and/or direct anonymous attestation schemes may employed in other embodiments.

In the illustrative embodiment, the coordination server 108 verifies the trusted execution environment key signature, determines the revocation status of the key signature (e.g., via the manufacturer server 112), and verifies the attestation quote received from the in-vehicle computing system 102. If successful, the coordination server 108 may assume that the sensor data has been securely transferred from the in-vehicle computing system 102 (e.g., the integrity of the sensors data has not been compromised), and the coordination server 108 may further process the sensor data. For example, the coordination server 108 may transmit the sensor data to the corresponding in-vehicle computing system 106 of an appropriate remote vehicle 122 (e.g., a remote vehicle 122 near the vehicle 120). It should be appreciated that the coordination server 108 may securely retrieve sensor data from the remote vehicles 122 in a similar manner. In other words, rather than communicating directly to one another in an ad hoc unsecured manner, the in-vehicle computing systems 102, 106 transmit sensor data to one another through the coordination server 108. Depending on the particular embodiment, the in-vehicle computing systems 102, 106 and/or the coordination server 108 may determine to which other in-vehicle computing system(s) 102, 106 the corresponding sensor data should be transmitted. Further, in some embodiments, the sensor data may also be transmitted from the coordination server 108 to the in-vehicle computing systems 102, 106 in a similar secure manner.

In some embodiments, one or more of the in-vehicle computing systems 102, 106 may be embodied as, or form a portion of, an in-vehicle infotainment system, a navigation system, and/or other vehicle-based computing system. In other embodiments, the in-vehicle computing systems 102, 106 may instead be embodied as a standalone computing device or computing system. For example, in some embodiments, the in-vehicle computing systems 102, 106 may instead be embodied as computing devices unrelated to vehicles. In such embodiments, each of the computing systems 102, 106 may be embodied as any type of computing device capable of performing the functions described herein (e.g., a server, desktop computer, laptop computer, tablet computer, notebook, netbook, Ultrabook™, cellular phone, smartphone, personal digital assistant, mobile Internet device, wearable computing device, Hybrid device, and/or any other computing/communication device).

In such embodiments, the coordination server 108 may coordinate the secure exchange of sensor information between a computing device and another computing device in some embodiments. In doing so, the coordination server 108 and the computing devices may perform functions similar to the functions described herein with regard to exchanging sensor information between vehicles. In particular, the coordination server 108 may establish a secure communication channel with the computing devices, and the coordination server 108 and the computing devices may attest the security of one another (i.e., of the corresponding trusted execution environments). As described above, in order to transfer sensor data, one of the computing devices may transmit the relevant sensor data, an attestation quote, and a trusted execution environment key signature to the coordination server 108. The coordination server 108 verifies the attestation quote and key signature and processes the sensor data accordingly (e.g., forwarding it to the appropriate remote computing device(s)). It should be appreciated that the methods described herein apply equally well to embodiments in which the in-vehicle computing systems 102, 106 are embodied as non-vehicular computing systems.

As shown in FIG. 1, the illustrative in-vehicle computing system 102 includes a processor 150, an input/output ("I/O") subsystem 152, a memory 154, one or more sensors 156, a security co-processor 158, a data storage 160, a communication circuitry 162, and one or more peripheral devices 164. Additionally, the I/O subsystem 152 may include a hardware protected I/O path in some embodiments. Of course, the in-vehicle computing system 102 may include other or additional components, such as those commonly found in a typical computing device (e.g., various input/output devices and/or other components), in other embodiments. Additionally, in some embodiments, one or more of the illustrative components may be incorporated in, or otherwise from a portion of, another component. For example, the memory 114, or portions thereof, may be incorporated in the processor 150 in some embodiments. In yet other embodiments, one or more of the components shown in the illustrative embodiment of FIG. 1 may be omitted (e.g., the security co-processor 158).

The processor 150 may be embodied as any type of processor capable of performing the functions described herein. For example, the processor 150 may be embodied as a single or multi-core processor(s), digital signal processor, microcontroller, or other processor or processing/controlling circuit. Similarly, the memory 154 may be embodied as any type of volatile or non-volatile memory or data storage capable of performing the functions described herein. In operation, the memory 154 may store various data and software used during operation of the in-vehicle computing system 102 such as operating systems, applications, programs, libraries, and drivers. The memory 154 is communicatively coupled to the processor 150 via the I/O subsystem 152, which may be embodied as circuitry and/or components to facilitate input/output operations with the processor 150, the memory 154, and other components of the in-vehicle computing system 102. For example, the I/O subsystem 152 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 152 may form a portion of a system-on-a-chip (SoC) and be incorporated, along with the processor 150, the memory 154, and other components of the in-vehicle computing system 102, on a single integrated circuit chip.

In the illustrative embodiment, the sensors 156 collect data based on the physical environment and/or context of the in-vehicle computing system 102. In various embodiments, the sensors 156 may be embodied as, or otherwise include, for example, inertial sensors, proximity sensors, optical sensors, light sensors, audio sensors, temperature sensors, motion sensors, piezoelectric sensors, pressure sensors, image sensors, and/or other types of sensors that generate data useful to the in-vehicle computing system 102, which may vary depending on the particular purpose of the in-vehicle computing system 102. Of course, the in-vehicle computing system 102 may also include components and/or devices configured to facilitate the user of the sensors 156.

It should be appreciated that, in some embodiments, a trusted execution environment of the in-vehicle computing system 102 (e.g., established in the security co-processor 158) may access sensor data generated by the sensors 156 through the hardware protected I/O path 166 (i.e., to provide trusted and tamper-resistant sensory readings). In other words, in some embodiments, the hardware protected I/O path 166 may serve as hardware-reinforced security for the sensor data. Further, in some embodiments, the sensor data generated by the sensors 156 may be inaccessible to the processor 150.

The security co-processor 158 may be embodied as any hardware component(s) or circuitry capable of establishing a trusted execution environment. For example, the security co-processor 158 may be embodied as a Trusted Platform Module (TPM), a manageability engine (ME), or an out-of-band processor. In some embodiments, one or more trusted execution environment (TEE) cryptographic keys 168 are stored or provisioned into the security co-processor 158. For example, a private Enhanced Privacy Identification (EPID) key and/or another private TEE key may be provisioned into the security co-processor 158 during the manufacturing process of the security co-processor 158 or of the in-vehicle computing system 102 or by virtue of a "join" protocol. In other embodiments, EPID or other TEE keys may be provisioned into one or more other components of the in-vehicle computing system 102. Additionally, in some embodiments, a TEE key certificate (e.g., an EPID certificate) is also stored or provisioned into the security co-processor 158. The TEE key certificate may include the public TEE key corresponding to the private TEE key provisioned into the security co-processor 158 and may be signed by the manufacturer of the security co-processor 158 (e.g., by the manufacturer server 112). It should also be appreciated that, in some embodiments, the security co-processor 158 may directly communicate with a corresponding security co-processor of the coordination server 108. Additionally, in some embodiments, the security co-processor 158 may establish a secure out-of-band communication link with remote devices and/or components (e.g., the coordination server 108).

As discussed in detail below, it should be appreciated that the EPID keys are associated with a group having a single public EPID key and a particular group identification (Group ID or GID). Any private EPID key, of which there may be many, belonging to the group may be paired with a corresponding public EPID key as a valid public-private cryptographic pair. For example, the security co-processor 158 (or trusted execution environment) of the in-vehicle computing system 102 may have one private EPID key and a security co-processor (or trusted execution environment) of a remote in-vehicle computing system 106 may have a different private EPID key. If the security co-processor 158 of the in-vehicle computing system 102 and the security co-processor of the in-vehicle computing system 106 are members of the same group (e.g., the same manufacturing lot), then their private EPID keys are valid asymmetric key pairs with the same public EPID key. For example, in the illustrative embodiment, a different group exists for each make/model of vehicle. Additionally, EPID keys allow both anonymity and unlinkability of the members and also key revocation. In other embodiments, another one-to-many cryptographic scheme may be used. Further, in some embodiments, a trusted application is used as a root of trust rather than hardware (e.g., the security co-processor 158). In such an embodiment, the TEE key may be provisioned into the platform running the application. It should be appreciated that, in the illustrative embodiment, the coordination server 108 has access to the public TEE key (e.g., public EPID key) and revocation lists to determine whether the private key signature of the in-vehicle computing system 102 is valid and unrevoked (e.g., by virtue of the manufacturer server 112). It should be appreciated that, in some embodiments, the trusted execution environment may be established on the in-vehicle computing system 102 without the use of a security co-processor 158. For example, in such embodiments, the processor 150 may establish a TEE context for secure execution (e.g., an Intel® Software Guard Extensions (SGX) secure enclave). The trusted execution environment may be "visible" as an encrypted memory region and execution space and may be able to be decrypted, and therefore accessible, only to the executing processor 150

(i.e., not available in unencrypted form on any of the processor buses). Accordingly, in embodiments in which the in-vehicle computing system 102 does not include the security co-processor 158 or the security co-processor 158 is not used, the in-vehicle computing device 102 may otherwise establish the trusted execution environment (e.g., with the processor 150) and perform the functions described herein.

The data storage 160 may be embodied as any type of device or devices configured for short-term or long-term storage of data such as, for example, memory devices and circuits, memory cards, hard disk drives, solid-state drives, or other data storage devices. The data storage 160 and/or the memory 154 may store various data during operation of the in-vehicle computing system 102 such as, for example, cryptographic keys, key certificates, and/or other data useful in the operation of the in-vehicle computing system 102 as discussed below.

The communication circuitry 162 of the in-vehicle computing system 102 may be embodied as any communication circuitry, device, or collection thereof, capable of enabling communications between the in-vehicle computing system 102 and other remote devices (e.g., the coordination server 108). The communication circuitry 162 may be configured to use any one or more communication technology (e.g., wireless or wired communications) and associated protocols (e.g., Ethernet, Bluetooth®, Wi-Fi®, WiMAX, etc.) to effect such communication.

In some embodiments, the in-vehicle computing system 102 may also include one or more peripheral devices 164. The peripheral devices 164 may include any number of additional peripheral or interface devices, such as speakers, microphones, additional storage devices, and so forth. The particular devices included in the peripheral devices 164 may depend on, for example, the type and/or intended use of the in-vehicle computing system 102 (e.g., whether the in-vehicle computing system 102 is a stand-alone system or incorporated into a larger in-vehicle infotainment system).

Each of the network(s) 104 may be embodied as any type of communication network capable of facilitating communication between the various devices of the system 100. For example, a network 104 may be configured to facilitate communication between the in-vehicle computing system 102 and the coordination server 108 (e.g., in the clear and/or via a secure communication channel) and another network 104 may be configured to facilitate communication between the coordination server 108 and one of the remote in-vehicle computing systems 106. In some embodiments, it is assumed that an uplink to the coordination server 108 is persistent (i.e., having ubiquitous network connectivity). As such, each of the networks 104 may include one or more networks, routers, switches, computers, and/or other intervening devices. For example, the networks 104 may be embodied as, or otherwise include, one or more cellular networks, telephone networks, local or wide area networks, publicly available global networks (e.g., the Internet), ad hoc networks, or any combination thereof.

Each of the coordination server 108, the attestation server 110, and the manufacturer server 112 may be embodied as any server or computing device capable of performing the functions described herein. Further, each of the coordination server 108, the attestation server 110, and the manufacturer server 112 may include components similar to the components of the in-vehicle computing system 102 described above and/or components commonly found in a server such as a processor, memory, I/O subsystem, data storage, peripheral devices, and so forth, which are not illustrated in FIG. 1 for clarity of the description.

As described herein, the coordination server 108 coordinates the secure exchange of sensor information between the vehicles 120, 122. In the illustrative embodiment, the attestation server 110 is embodied as a device or system that each of the devices/systems of the system 100 trusts and is configured to evaluate attestation quotes (e.g., of the in-vehicle computing systems 102, 106 and the coordination server 108). That is, as described below, an in-vehicle computing system 102, 106 or the coordination server 108 may generate an attestation quote based on its corresponding trusted execution environment to prove, for example, that it is executing code in an actual trusted execution environment or a particular type of trusted execution environment. As discussed below, in the illustrative embodiment, the trusted execution environment is established as an Intel® Software Guard Extensions (SGX) secure enclave. In other words, in the illustrative embodiment, the in-vehicle computing system 102 (e.g., the security co-processor 158) allocates a contiguous region of linear address space of the memory 154 (or of a secure memory inaccessible to the processor 150) that is protected from non-enclave memory accesses (i.e., memory accesses originating from outside the contiguous memory region) for execution of instructions related to the exchange of sensor data. Accordingly, in such embodiments, an SGX enclave quote may be generated for attestation purposes. In other embodiments, a trusted platform module (TPM) quote or other type of trust quote may be generated for evaluation by the attestation server 110. In evaluating the attestation quotes, the attestation server 110 may utilize, for example, historic security information, quotas, threshold values, security parameters, measurements of secure code execution, and/or other measured characteristics of the corresponding trusted execution environment.

As discussed above, the TEE keys provisioned or otherwise bound to the corresponding trusted execution environments may be revoked. In the illustrative embodiment, the manufacturer server 112 maintains one or more revocation lists indicating which TEE keys have been revoked (e.g., based on the group identification of the TEE key). It should be appreciated that, in some embodiments, the revocation lists allow the manufacturer server 112 to determine, for example, private key revocation, signature-based revocation, and/or group public key revocation. The manufacturer server 112 may periodically update the revocation lists (e.g., during the initial TEE key provisioning, based on the addition or removal of members from a particular group, based on a specific revocation, etc.). In some embodiments, the manufacturer server 112 may act as an Online Certificate Status Protocol (OCSP) responder for providing the revocation status of various keys and/or certificates (e.g., EPID keys and certificates). For example, the presence of key, signature, and/or group on a revocation list(s) (e.g., PRIV-RL, SIG-RL, GROUP-RL, and/or other revocation lists) may be determined. Further, in some embodiments, the OCSP responder may be queried for an interactive certificate/key standing check. In some embodiments, the manufacturer server 112 and the coordination server 108 communicate with one another to keep one another apprised of changes related to TEE keys. For example, as indicated above, the coordination server 108 may confirm that a key signature received from a vehicle 120, 122 is still valid (i.e., not revoked). In other embodiments, the manufacturer server 112 may form a portion of the coordination server 108.

Figure 2:
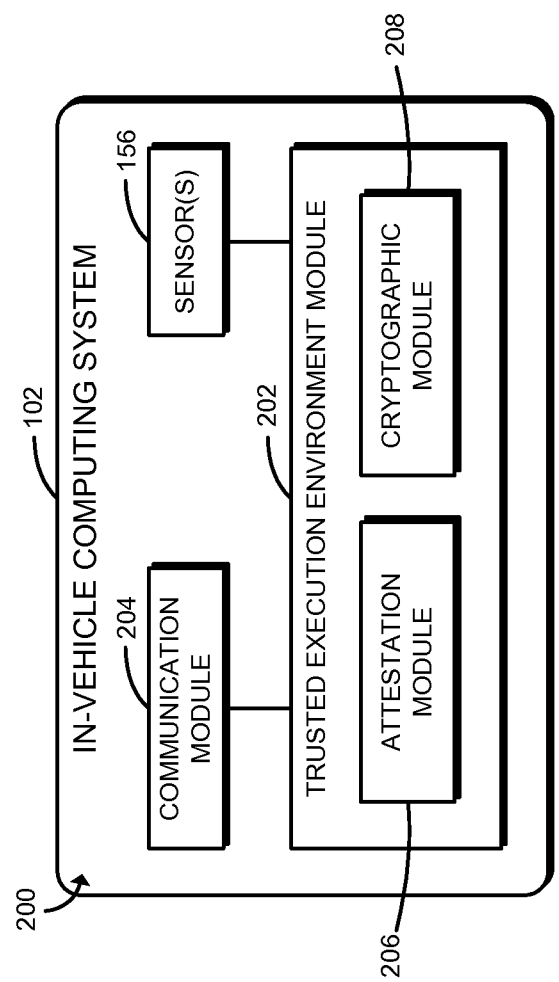
FIG. 2 is a simplified block diagram of at least one embodiment of an environment of an in-vehicle computing system of the system of FIG. 1.

Referring now to FIG. 2, in use, the in-vehicle computing system 102 establishes an environment 200 for exchanging sensor information of the vehicle 120. The illustrative environment 200 includes a trusted execution environment module 202 and a communication module 204. Additionally, the trusted execution environment module 202 includes an attestation module 206 and a cryptographic module 208. Each of the trusted execution environment module 202, the communication module 204, the attestation module 206, and the cryptographic module 208 may be embodied as hardware, software, firmware, or a combination thereof. For example, each of the modules, logic, and other components of the environment 200 may form a portion of, or otherwise be established by, the processor 150 of the in-vehicle computing device 102.

The trusted execution environment module 202 establishes a secure and trusted execution environment on the in-vehicle computing system 102 (e.g., for execution of instructions related to the exchange of sensor data). En particular, in the illustrative embodiment, the trusted execution environment module 202 establishes and an Intel® Software Guard Extensions (SGX) secure enclave. Further, in some embodiments, the security co-processor 158 includes the trusted execution environment module 202. That is, the trusted execution environment module 202 may be incorporated into or be otherwise executed by the security co-processor 158. In other embodiments, the trusted execution environment module 202 may be independent of the security co-processor 158 and/or the trusted execution environment may be otherwise established as discussed above. Further, in some embodiments, the TEE key 168 may be stored in the security co-processor 158 and may only be accessed by the trusted execution environment module 202. As discussed above, the trusted execution environment module 202 receives sensor data generated by the sensors 156 (e.g., through the hardware protected I/O path 166) for transmission to the coordination server 108 in order to maintain the integrity of the sensor data. Additionally, the trusted execution environment module 202 may perform some action based on the sensor data generated by the sensors 156 and/or sensor data received from the coordination server 108 (i.e., sensor data generated by a remote vehicle 122). For example, as discussed above, the in-vehicle computing system 102 may perform some evasive action (e.g., stop or slow the vehicle 120).

In the illustrative embodiment, the trusted execution environment module 202 includes the attestation module 206 and the cryptographic module 208. Accordingly, in some embodiments, the functions of the attestation module 206 and the cryptographic module 208 may be performed in a trusted execution environment of the in-vehicle computing system 102. The attestation module 206 is configured to generate an attestation quote based on the trusted execution environment and/or the security co-processor 158 of the in-vehicle computing system 102. For example, the attestation module 206 may generate an SGX secure enclave quote, a TPM quote, and/or another type of trust quote depending on the particular embodiment. It should be appreciated that, in some embodiments, the attestation module 206 takes a measurement (e.g., a hash) of code executing (or for execution) in the trusted execution environment (e.g., a secure enclave) to prove, for example, the integrity of the code executed in the trusted execution environment. Additionally, in some embodiments, the attestation module 206 may receive an attestation quote from the coordination server 108 and confirm the authenticity of the coordination server 108 and/or a corresponding trusted execution environment of the coordination server 108 based on the attestation quote. For example, the attestation module 206 may verify that the code executed in the trusted execution environment has not been altered. Of course, as described herein, in some embodiments, the in-vehicle computing system 102 may communicate with the attestation server 110 (e.g., via the communication module 204) to verify the attestation quote of the coordination server 108. The coordination server 108 may similarly utilize the attestation server 110 to verify the attestation quote of the in-vehicle computing system 102.

The cryptographic module 208 performs various cryptographic functions for the in-vehicle computing system 102. In some embodiments, the cryptographic module 208 may be embodied as a cryptographic engine, an independent security co-processor of the in-vehicle computing system 102, a cryptographic accelerator incorporated into the processor 150, or a standalone cryptographic software/firmware. In some embodiments, the cryptographic module 208 may cooperate with the communication module 204 to establish a secure connection with remote devices (e.g., the coordination server 108) over a network 104. For example, the cryptographic module 208 may encrypt and decrypt communications between the in-vehicle computing system 102 and the coordination server 108. In some embodiments, the cryptographic module 208 may perform a key exchange with the coordination server 108 or a component of the coordination server 108 (e.g., a corresponding security co-processor). For example, the cryptographic module 208 may perform a Diffie-Hellman key exchange, and Elliptic Curve Diffie-Hellman key exchange, or another suitable cryptographic key exchange protocol with the coordination server 108 (e.g., to generate session keys).

Additionally, the cryptographic module 208 may cryptographically sign outgoing communications. For example, the cryptographic module 208 may sign a message using the private TEE key 168 (e.g., a private EPID key) of the in-vehicle computing system 102. In some embodiments, the cryptographic module 208 is also configured to generate hashes (e.g., keyed hashes) using one or more suitable algorithms, functions, or mechanisms. For example, as discussed below, the cryptographic module 208 may generate a message authentication code (MAC) of a message based on, for example, a session key shared between the in-vehicle computing system 102 and the coordination server 108. In particular, in some embodiments, the in-vehicle computing system 102 may perform a key exchange protocol such as a Sign-and-MAC (SIGMA) protocol. In other words, in some embodiments, the in-vehicle computing system 102 may establish a SIGMA session with the coordination server 108. Further, in some embodiments, the cryptographic module 208 may generate a certificate (e.g., EPID certificates) for transmission with a cryptographically-signed communication. Additionally, in some embodiments, the cryptographic module 208 may also verify cryptographic signatures of incoming messages (e.g., based on public cryptographic keys received from the relevant parties such as the manufacturer server 112 and/or a certificate authority).

The communication module 204 handles the communication between the in-vehicle computing system 102 and remote computing devices (e.g., the coordination server 108) through the network(s) 104. As discussed in detail herein, the communication module 204 is configured to establish a secure communication channel between the trusted execution environment of the in-vehicle computing system 102 and a corresponding trusted execution environment of the coordination server 108. In particular, in the illustrative embodiment, the communication module 204 establishes a Secure Sockets Layer (SSL) communication channel between the trusted execution environments. Additionally, as discussed below, the communication module 204 may transmit sensor data, an attestation quote, and/or a TEE key signature to the coordination server 108. Similarly, the communication module 204 may receive sensor data generated by sensors of the remote vehicle(s) 122 from the coordination server 108 (e.g., after the coordination server 108 verifies the integrity of the sensor data). It should be appreciated that the in-vehicle computing system 106 of each of the vehicles 122 may include modules and perform actions similar to the in-vehicle computing system 102 of the vehicle 120 described above.

Figure 3:
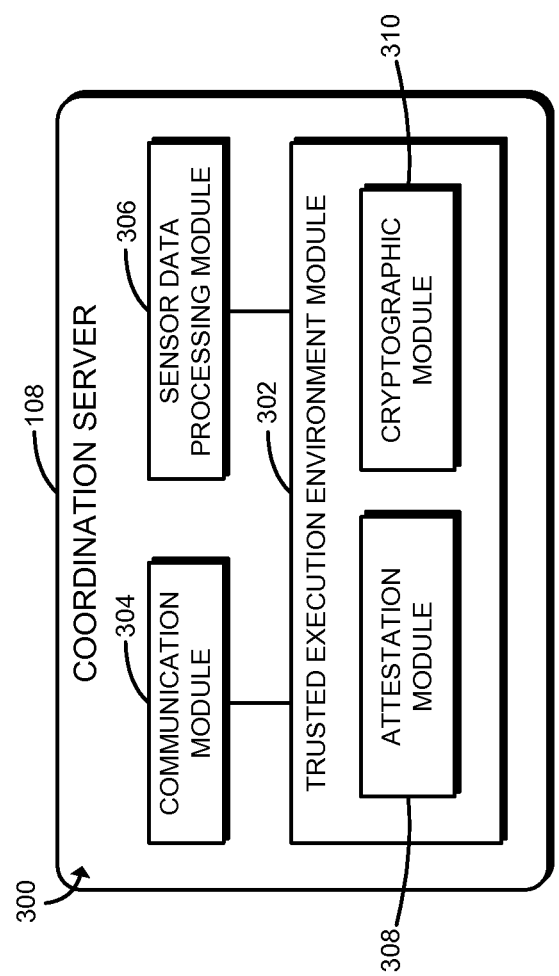
FIG. 3 is a simplified block diagram of at least one embodiment of an environment of a coordination server of the system of FIG. 1.

Referring now to FIG. 3, in use, the coordination server 108 establishes an environment 300 for coordinating the exchange of sensor information between vehicles 120, 122 or, more particularly, between the in-vehicle computing systems 102, 106. The illustrative environment 300 includes a trusted execution environment module 302, a communication module 304, and a sensor data processing module 306. Additionally, the trusted execution environment module 302 includes an attestation module 308 and a cryptographic module 310. Each of the trusted execution environment module 302, the communication module 304, the sensor data processing module 306, the attestation module 308, and the cryptographic module 310 may be embodied as a hardware, software, firmware, or a combination thereof. For example, each of the modules, logic, and other components of the environment 300 may form a portion of, or otherwise be established by, the processor of the coordination server 108.

In the illustrative embodiment, the trusted execution environment module 302, the communication module 304, the attestation module 308, and the cryptographic module 310 of the environment 300 of the coordination server 108 are similar to the corresponding modules of the environment 200 of the in-vehicle computing system 102 discussed above. The description of those components of the environment 200 is equally applicable to the description of the components of the environment 300 and is not repeated herein in its entirety for clarity of the description. For example, the trusted execution environment module 302 establishes a trusted execution environment on the coordination server 108 (e.g., for secure receipt of sensor data from the in-vehicle computing systems 102, 106). Further, the attestation module 308 is configured to generate an attestation quote based on the trusted execution environment of the coordination server 108 for transmittal to the in-vehicle computing system 102. Additionally, the attestation module 308 may receive an attestation quote from the in-vehicle computing system 102 (i.e., of the trusted execution environment of the in-vehicle computing system 102) and confirm the authenticity of the in-vehicle computing system 102 or its corresponding trusted execution environment based on that attestation quote. Similar to the in-vehicle computing system 102, in some embodiments, the coordination server 108 may communicate with the attestation server 110 to verify the attestation quote.

The cryptographic module 310 performs various cryptographic functions for the in-vehicle computing system 102 such as those discussed above with regard to the cryptographic module 208. Further, the cryptographic module 310 may verify a TEE key 168 signature received from the in-vehicle computing system 102. For example, as discussed above, the TEE key 168 may be embodied as an EPID key is some embodiments. Accordingly, in such embodiments, the cryptographic module 310 may verify an EPID key signature by applying the public EPID key to the cryptographically-signed communication. Further, in some embodiments, the coordination server 108 may receive an EPID key certificate (or other suitable key certificate) from the in-vehicle computing system 102, which may be used in verifying the EPID key signature. Additionally, the cryptographic module 310 module may communicate (i.e., via the communication module 304) with the manufacturer server 112 to verify that the TEE key 168 signature (e.g., EPID key signature) of the in-vehicle computing system 102 has not been revoked as discussed above.

The sensor data processing module 306 is configured to process the sensor data received from the in-vehicle computing systems 102, 106 (e.g., after the security of the sensor data has been verified). In some embodiments, the sensor data processing module 306 processes the sensor data in response to verification of the attestation quote and key signature received from the in-vehicle computing system 102 and verification that the key signature has not been revoked. For example, the sensor data processing module 306 may determine where to transmit the sensor data received from the in-vehicle computing system 102 (i.e., to which other in-vehicle computing systems 106). In doing so, the sensor data processing module 306 may consider, for example, any instructions received from the in-vehicle computing system 102, the absolute and/or relative location of the remote in-vehicle computing systems 106, and/or other relevant data.

Figure 4:
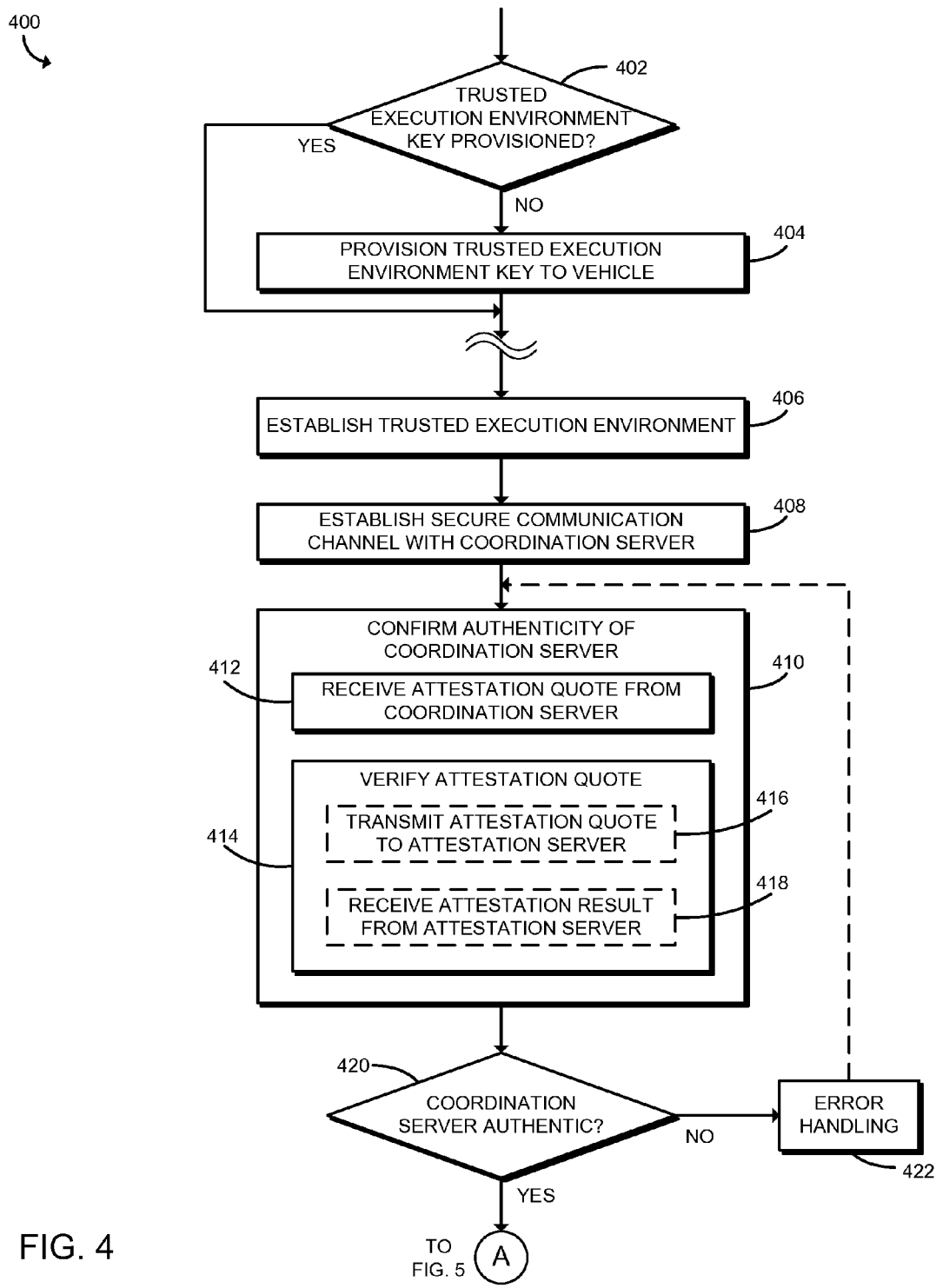
FIGS. 4-5 is a simplified flow diagram of at least one embodiment of a method of exchanging sensor information using the in-vehicle computing system of the system of FIG. 1.
Figure 5:
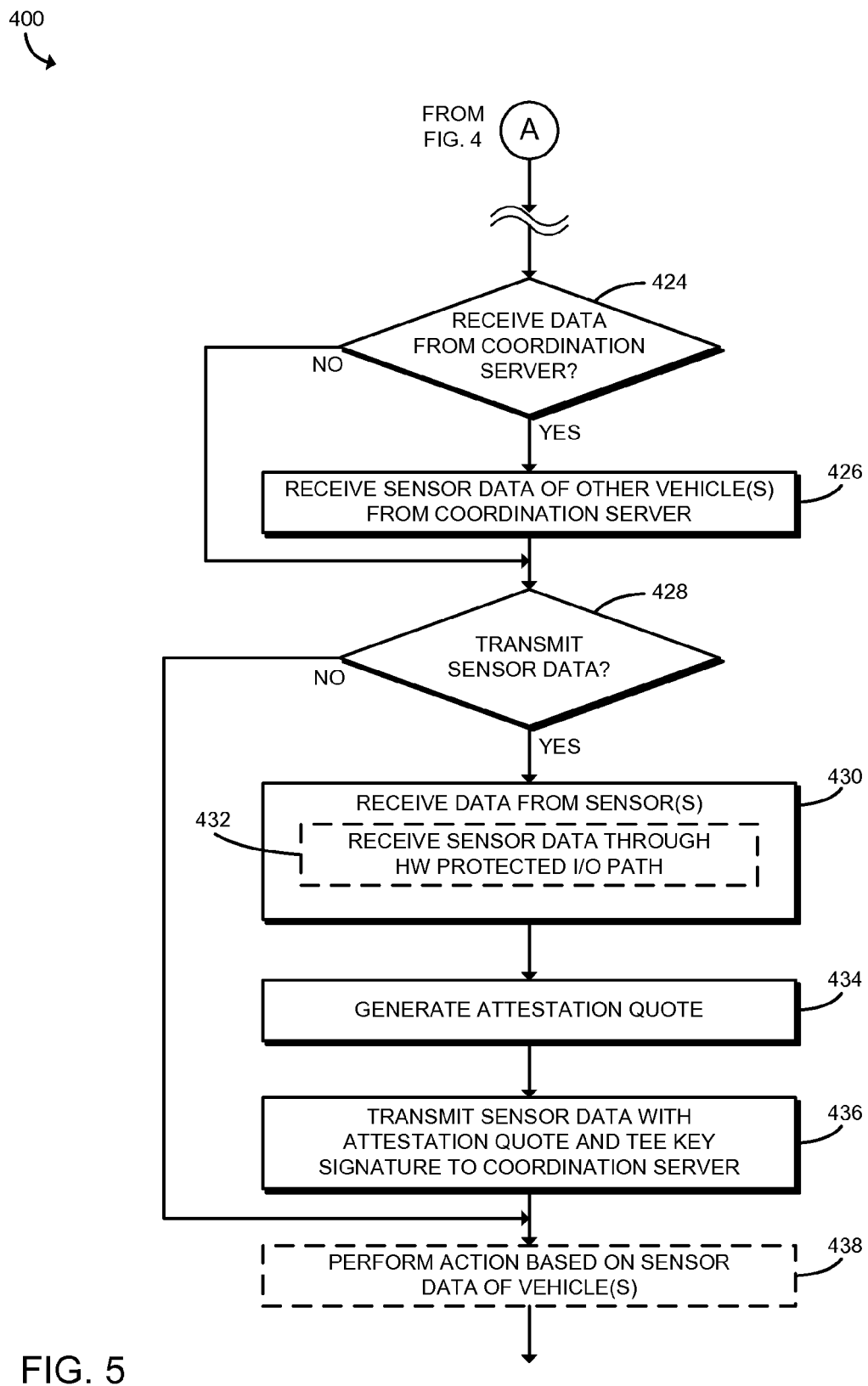

Referring now to FIGS. 4-5, in use, the in-vehicle computing system 102 may execute a method 400 for exchanging sensor information of the vehicle 120. In particular, the in-vehicle computing system 102 securely transmits sensor data generated by the sensors 156 to the coordination server 108, which may be securely forwarded to the in-vehicle computing systems 106 of relevant remote vehicles 122 (e.g., nearby vehicles 122). As discussed above, in some embodiments, the in-vehicle computing systems 106 may execute a similar method to the method 400 for exchanging sensor information (e.g., for transmitting sensor data to the in-vehicle computing system 102). The illustrative method 400 begins with block 402 in which the in-vehicle computing system 102 determines whether a trusted execution environment (TEE) key 168 has been provisioned to the in-vehicle computing system 102. In the illustrative embodiment, the trusted execution environment is bound to the trusted execution environment of the in-vehicle computing system 102 or, more generally, to the vehicle 120 or in-vehicle computing system 102. As discussed above, the TEE key 168 (e.g., a private EPID key) may be provisioned to the in-vehicle computing system 102 or a particular component of the in-vehicle computing system 102 (e.g., the security co-processor 158) during the manufacturing phase of the vehicle 120. Alternatively, the TEE key 168 may be later provisioned to the in-vehicle computing system 102. As such, if the in-vehicle computing system 102 determines that a TEE key has not yet been provisioned, the in-vehicle computing system 102 provisions a TEE key 168 to the vehicle 120 in block 404. For example, the in-vehicle computing system 102 may utilize a "join" protocol to enable a private one-to-many cryptographic key (e.g., a private EPID key) to be provisioned to the vehicle 120 such that the private cryptographic key corresponds with a public one-to-many cryptographic key associated with a particular group (e.g., vehicle make/model). In some embodiments, the in-vehicle computing system 102 may leverage the Intel® Trusted Connect Service and/or another suitable mechanism in provisioning, for example, EPID keys to the vehicle 120.

In block 406, the in-vehicle computing system 102 establishes a trusted execution environment. As indicated above, in the illustrative embodiment, the in-vehicle computing system 102 establishes an SGX-protected secure enclave within which to execute instructions related to the exchange of sensor data. It should be appreciated that the in-vehicle computing system 102 may establish a trusted execution environment at any suitable point in time (i.e., prior to the transfer of sensor data to the coordination server 108). For example, in some embodiments, the in-vehicle computing system 102 establishes the trusted execution environment upon ignition of the vehicle 120 or powering-up of the in-vehicle computing system 102.

In block 408, the in-vehicle computing system 102 establishes a secure communication channel with the coordination server 108. In particular, in the illustrative embodiment, the in-vehicle computing system 102 establishes a secure communication channel between the trusted execution environment of the in-vehicle computing system 102 and a corresponding trusted execution environment of the coordination server 108. In some embodiments, the secure communication channel is an SSL-protected communication channel; however, other secure communication channels may be established in other embodiments (e.g., an out-of-band communication channel).

In block 410, the in-vehicle computing system 102 confirms the authenticity of the coordination server 108. For example, in some embodiments, the in-vehicle computing system 102 confirms that it is communicating with a real coordination server 108 and verifies its identity and integrity of the code running on the coordination server 108 (e.g., in the trusted execution environment). In particular, in block 412, the in-vehicle computing system 102 receives an attestation quote from the coordination server 108. As discussed above, in the illustrative embodiment, the attestation quote is a measurement of the trusted execution environment of the coordination server 108. In some embodiments, the in-vehicle computing system 102 receives the attestation quote from the coordination server 108 in response to a request from the in-vehicle computing system 102 for proof that the coordination server 108 is a trusted entity or, more specifically, that the coordination server 108 is executing code in a trusted execution environment (e.g., an SGX-protected enclave). In block 414, the in-vehicle computing system 102 verifies the attestation quote received from the coordination server 108. For example, the attestation quote may be compared to reference data to determine the security and/or authenticity of the device/component that generated the attestation quote. In doing so, in block 416, the in-vehicle computing system 102 may transmit the attestation quote to the attestation server 110, which analyzes the attestation quote. As indicated above, the attestation server 110 may be any trusted third-party server capable of evaluating attestation quotes provided by the in-vehicle computing system 102 and/or the coordination server 108. Of course, in some embodiments, the in-vehicle computing system 102 may utilize different attestation servers 110 to verify attestation quotes. Further, in some embodiments, the in-vehicle computing system 102 may be able to evaluate the attestation quote itself. In block 418, the in-vehicle computing system 102 receives the attestation result from the attestation server 110 indicating whether the coordination server 108 or, more particularly, the trusted execution environment of the coordination server 108 is secure.

In block 420, the in-vehicle computing system 102 determines whether the coordination server 108 is authentic and/or secure based on the attestation result. If not, the in-vehicle computing system 102 performs error-handling procedures in block 422. In some embodiments, the in-vehicle computing system 102 may determine that the error is correctable and again attempts to confirm the authenticity of the coordination server 108, establish a new secure communication channel with the coordination server 108, and/or otherwise correct the error. Of course, in other embodiments, the error may be uncorrectable in which the in-vehicle computing system 102 may terminate the method 400.

If the in-vehicle computing system 102 determines that the coordination server 108 is secure and authentic, the method 400 advances to block 424 of FIG. 5 in which the in-vehicle computing system 102 determines whether to receive data from the coordination server 108. If so, in block 426, the in-vehicle computing system 102 may receive sensor data generated by sensors of other remote vehicles 122 from the coordination server 108. In some embodiments, the sensor data may signed, encrypted, and/or otherwise securely transmitted to the in-vehicle computing system 102 over the secure communication channel. Additionally, in some embodiments, the in-vehicle computing system 102 may receive instructions from the coordination server 108 regarding how to process the sensor data and/or actions to perform based on an analysis of remote vehicle 122 sensor data. It should be appreciated that, in some embodiments, the coordination server 108 determines when, and to what extent, to transmit data to the in-vehicle computing system 102.

In block 428, the in-vehicle computing system 102 determines whether to transmit sensor data to the coordination server 108. As indicated above, in the illustrative embodiment, if the in-vehicle computing system 102 wants to transmit sensor data to another in-vehicle computing system 106, the coordination server 108 acts as a secure intermediary to protect the security of the data. If the in-vehicle computing system 102 determines to transmit sensor data to the coordination server 108, the in-vehicle computing system 102 receives the sensor data from the sensors 156 in block 430. In some embodiments, in block 432, the in-vehicle computing system 102 may receive the sensor data through the hardware protected I/O path 166. That is, in some embodiments, a hardware protected I/O path 166 is established between the sensors 156 and the trusted execution environment (or the security co-processor 158) such that the sensor data cannot be modified (e.g., by a virus) before "reaching" the trusted execution environment as discussed above.

In block 434, the in-vehicle computing system 102 generates an attestation quote of the trusted execution environment established by the in-vehicle computing system 102. For example, in some embodiments, the in-vehicle computing system 102 may generate a secure enclave quote. Further, in block 436, the in-vehicle computing system 102 transmits the sensor data with the generated attestation quote and the TEE key 168 signature to the coordination server 108. It should be appreciated that, in some embodiments, the in-vehicle computing system 102 establishes a SIGMA session with the coordination server 108 for secure communication (e.g., an EPID-based SIGMA session). Further, the in-vehicle computing system 102 may prepare the TEE key 168 signature (e.g., EPID key signature) in any suitable way. For example, in some embodiments, the in-vehicle computing system 102 cryptographically signs the attestation quote and/or the sensor data with the TEE key 168 for transmission to the coordination server 108. In other embodiments, the in-vehicle computing system 102 may cryptographically sign another communication to be transmitted with the attestation quote and the sensor data. Further, in some embodiments, the in-vehicle computing system 102 may also transmit a TEE key 168 certificate (e.g., EPID certificate) to the coordination server 108 (e.g., for verification of the TEE key 168 signature). As discussed herein, the coordination server 108 verifies the key signature and the attestation quote and, upon successful verification, processes the sensor data.

Regardless of whether the in-vehicle computing system 102 determines whether to transmit sensor data to the coordination server 108, in block 438, the in-vehicle computing system 102 may perform some action based on the sensor data of the vehicle(s) 122 received from the coordination server 108. In some embodiments, the in-vehicle computing system 102 may analyze that sensor data in conjunction with data generated by the sensors 156 to determine, for example, whether the in-vehicle computing system 102 should take some security or collision avoidance action (e.g., stop the vehicle 120). It should be appreciated that, depending on the particular embodiment, the in-vehicle computing system 102 may transmit/receive data to/from the coordination server 108 in any suitable order.

Figure 6:
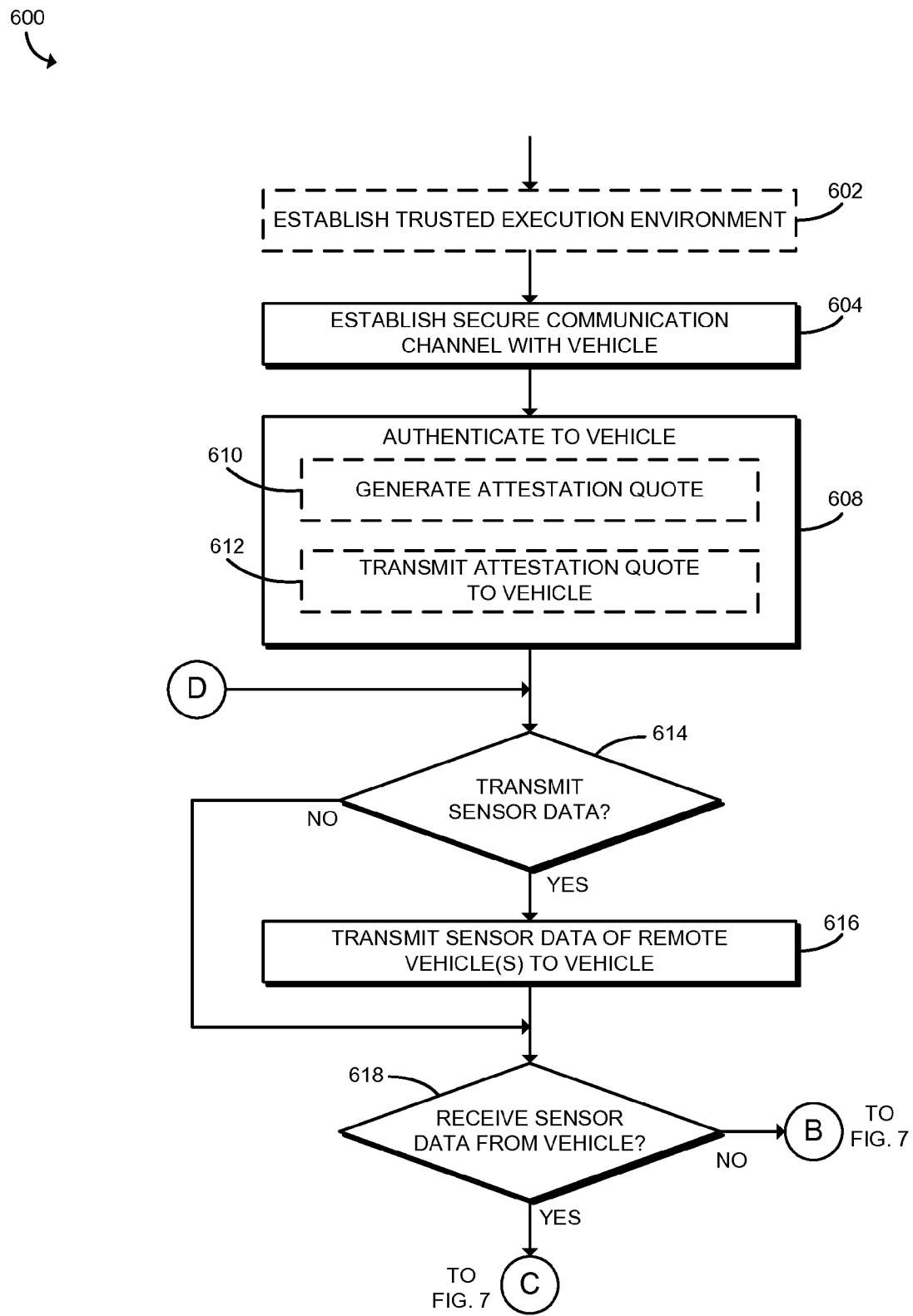
FIGS. 6-7 is a simplified flow diagram of at least one embodiment of a method of coordination the exchange of sensor information between in-vehicle computing systems using the coordination server of the system of FIG. 1.
Figure 7:
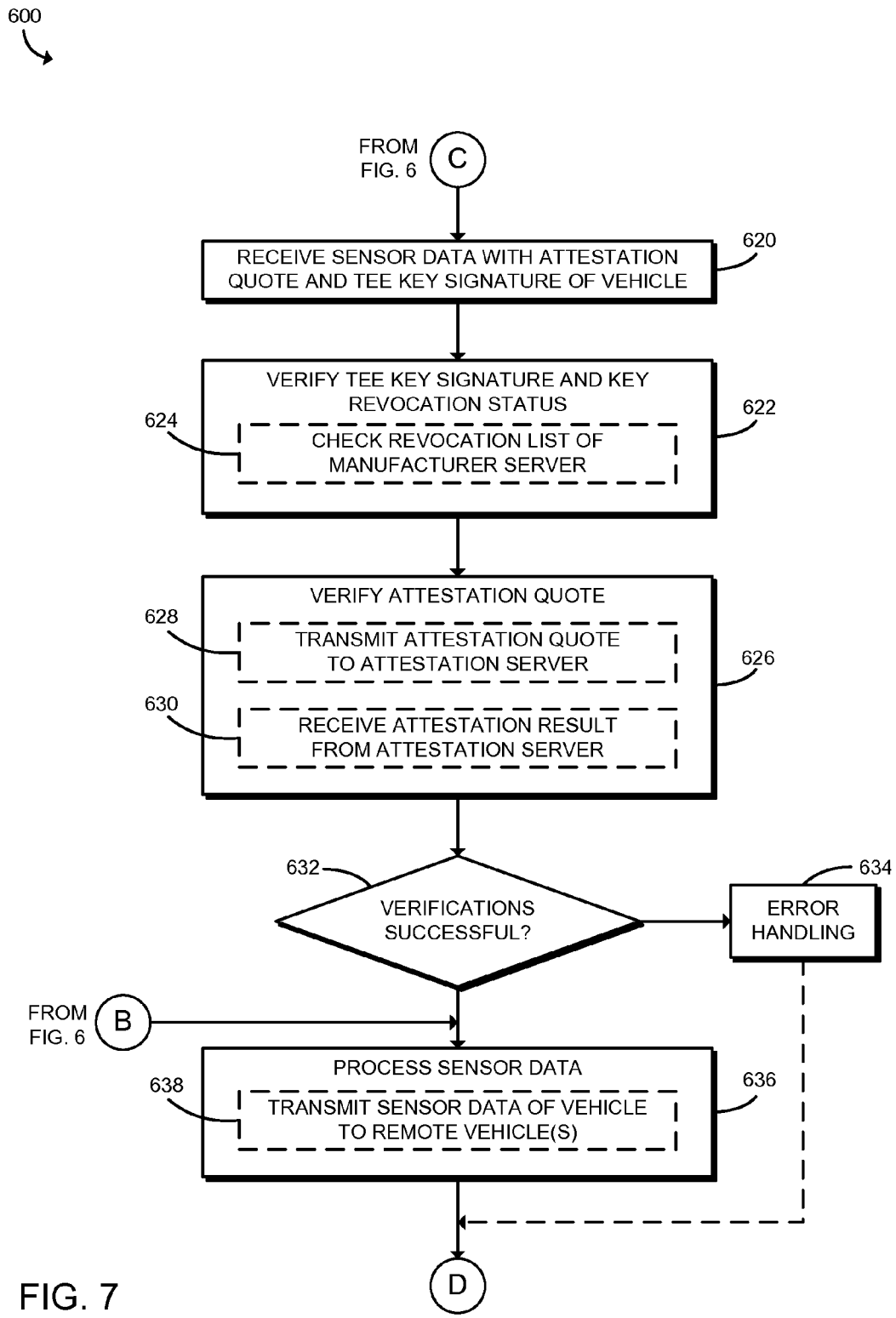

Referring now to FIGS. 6-7, in use, the coordination server 108 may execute a method 600 for exchanging sensor information between vehicles 120, 122. Although the method 600 is described primarily in reference to communication between the coordination server 108 and the in-vehicle computing system 102, it should be appreciated that the coordination server 108 may communicate with the other in-vehicle computing systems 106 in a similar manner. Further, although communication may be discussed in reference to the vehicle 120, the coordination server 108 may be, more specifically, communicating with the in-vehicle computing system 102 of the vehicle 120. The illustrative method 600 begins with block 602 in, which the coordination server 108 establishes a trusted execution environment if it has not done so already. In some embodiments, the coordination server 108 executes some or all sensor data exchange related instructions in the trusted execution environment. In block 604, the coordination server 108 establishes a secure communication channel (e.g., an SSL communication channel) with the vehicle 120 or, more particularly, the in-vehicle computing system 102 as described above.

In block 608, the coordination server 108 authenticates itself to the vehicle 120 or in-vehicle computing system 102. As discussed above, in some embodiments, the coordination server 108 may do so in response to a request from the vehicle 120 to prove that the coordination server 108 is a trusted/secure entity and/or that sensor data exchanged related instructions are being executed in a trusted execution environment (e.g., an SGX-protected enclave). In doing so, the coordination server 108 may generate an attestation quote of its trusted execution environment in block 610 and transmit the attestation quote to the vehicle 120 in block 612. As discussed above, the in-vehicle computing system 102 may evaluate the attestation quote itself or transmit the attestation quote to the attestation server 110 for evaluation depending on the particular embodiment.

In block 614, the coordination server 108 determines whether to transmit sensor data to the vehicle 120. If so, the coordination server 108 transmits sensor data received from one or more of the remote vehicles 122 to the vehicle 120 in block 616. It should be appreciated that the coordination server 108 may analyze various characteristics (e.g., relative location data, vehicle-based requests/instructions, etc.) to determine which sensor data to provide to the vehicle 120. For example, in some embodiments, the coordination server 108 transmits all sensor data received from vehicles 122 within a threshold distance of the vehicle 120. Further, the coordination server 108 may also provide instructions to the vehicle 120 regarding how to handle the transmitted data, the identity of the vehicles 122 from which the sensor data was generated, the relative locations of the vehicles 122, metadata associated with the sensor data, and/or other relevant information.

In block 618, the coordination server 108 determines whether to receive sensor data from the vehicle 120. If so, the method 600 advances to block 620 of FIG. 7 in which the coordination server 108 receives sensor data with an attestation quote of the trusted execution environment of the vehicle 120 and a TEE key 168 signature (e.g., an EPID key signature) from the vehicle 120 as discussed above. Further, in some embodiments, the coordination server 108 may also receive a key certificate from the vehicle 120. In block 622, the coordination server 108 verifies the TEE key 168 signature and the revocation status of the key/signature. In doing so, in block 624, the coordination server 108 may check revocation list(s) of the manufacturer server 112. As discussed above, in some embodiments, the revocation lists allow the manufacturer server 112 to determine, for example, private key revocation, signature-based revocation, and/or group public key revocation. Accordingly, in the illustrative embodiment, the coordination server 108 determines whether the TEE key 168 (e.g., EPID key) used to sign the cryptographically-signed communication received from the vehicle 120 has in any way been revoked.

In block 626, the coordination server 108 verifies the attestation quote received from the vehicle 120. As discussed above, in doing so, the coordination server 108 may transmit the attestation quote to the attestation server 110 for evaluation in block 628 and receive an attestation result from the attestation server 110 in block 630. In block 632, the coordination server 108 determines whether the verifications of the TEE key 168 signature and attestation quote were successful and ensures that the signature has not been revoked. If one of the verifications was unsuccessful or the TEE key 168 signature is no longer valid (e.g., due to revocation), the coordination server 108 performs error-handling procedures in block 634. If the error is uncorrectable, the coordination server 108 may terminate the method 600. However, if the error may be corrected, the method 600 may return, for example, to block 614 of FIG. 6 in which the coordination server 108 determines whether to transmit sensor data to the vehicle 120.

If the verifications are successful in block 632 or the coordination server 108 determines not to receive sensor data in block 618, the coordination server 108 processes received sensor data in block 636. For example, the coordination server 108 may process the sensor data received from the vehicle 120 in block 620 and/or sensor data previously received from the vehicle 120 or the other vehicles 122. In doing so, in block 638, the coordination server 108 may transmit the sensor data received from the vehicle 120 to the remote vehicles 122 in block 636. It should be appreciated that the coordination server 108 may determine which vehicles 122 to which to transmit the sensor data in a similar manner as determining which sensor data to provide to the vehicle 120 (e.g., based on geographical location, etc.). The method 600 returns to block 614 of FIG. 6 in which the coordination server 108 determines whether to transmit sensor data to the vehicle 120.). It should be appreciated that, depending on the particular embodiment, the coordination server 108 may transmit/receive data to/from the vehicles 120, 122 in any suitable order.

EXAMPLES

Illustrative examples of the technologies disclosed herein are provided below. An embodiment of the technologies may include any one or more, and any combination of, the examples described below.

Example 1 includes an in-vehicle computing system of a vehicle for securely exchanging sensor information, the in-vehicle computing system comprising a sensor to generate sensor data; a trusted execution environment module to establish a trusted execution environment on the in-vehicle computing system, wherein a private key is bound to the trusted execution environment; and a communication module to establish a secure communication channel between the trusted execution environment and a corresponding trusted execution environment of a coordination server; wherein the trusted execution environment module is further to (i) confirm the authenticity of the coordination server, (ii) receive the sensor data from the sensor, (iii) generate an attestation quote based on the trusted execution environment of the in-vehicle computing system, and (iv) transmit, to the coordination server over the secure communication channel and by the communication module, the sensor data, the attestation quote, and a cryptographically-signed communication signed with the private key.

Example 2 includes the subject matter of Example 1, and wherein to establish the trusted execution environment comprises to allocate a contiguous region of linear address space of a memory of the in-vehicle computing system for execution of a plurality of instructions that is protected from memory accesses originating from outside the contiguous region.

Example 3 includes the subject matter of any of Examples 1 and 2, and wherein to establish the secure communication channel comprises to establish a Secure Sockets Layer channel between the trusted execution environment of the in-vehicle computing system and the corresponding trusted execution environment of the coordination server.

Example 4 includes the subject matter of any of Examples 1-3, and wherein to confirm the authenticity of the coordination server comprises to receive an attestation quote from the coordination server based on the corresponding trusted execution environment of the coordination server; and verify the attestation quote.

Example 5 includes the subject matter of any of Examples 1-4, and wherein to verify the attestation quote comprises to transmit the attestation quote to an attestation server; and receive, from the attestation server in response to transmittal of the attestation quote, an attestation result indicating whether the trusted execution environment of the coordination server is secure.

Example 6 includes the subject matter of any of Examples 1-5, and wherein to confirm the authenticity of the coordination server comprises to verify the integrity of code executing in the corresponding trusted execution environment of the coordination server.

Example 7 includes the subject matter of any of Examples 1-6, and further including a main processor and a security co-processor different from the main processor, wherein to establish the trusted execution environment comprises to establish a trusted execution environment on the security co-processor of the in-vehicle computing system; wherein to receive the sensor data comprises to receive, by the trusted execution environment of the in-vehicle computing system, the sensor data through a hardware-protected input-output path between the security co-processor and the sensor; and wherein the private key is bound to the security co-processor.

Example 8 includes the subject matter of any of Examples 1-7, and wherein the cryptographically-signed communication comprises at least one of the sensor data or the attestation quote.

Example 9 includes the subject matter of any of Examples 1-8, and wherein the communication module is further to receive, from the coordination server and over the secure communication channel, sensor data generated by a remote vehicle.

Example 10 includes the subject matter of any of Examples 1-9, and wherein the trusted execution environment module is further to perform an action based on the sensor data generated by the sensor of the vehicle and the sensor data generated by the remote vehicle.

Example 11 includes the subject matter of any of Examples 1-10, and wherein the private key is provisioned to the trusted execution environment.

Example 12 includes the subject matter of any of Examples 1-11, and wherein the private key is a private Enhanced Privacy Identification key corresponding with a public Enhanced Privacy Identification key accessible to the coordination server.

Example 13 includes a method of securely exchanging sensor information by an in-vehicle computing system, the method comprising establishing, by the in-vehicle computing system, a trusted execution environment on the in-vehicle computing system; establishing, by the in-vehicle computing system, a secure communication channel between the trusted execution environment and a corresponding trusted execution environment of a coordination server; confirming, by the trusted execution environment, the authenticity of the coordination server; receiving, by the trusted execution environment, sensor data generated by a sensor of the vehicle; generating, by the trusted execution environment, an attestation quote based on the trusted execution environment of the in-vehicle computing system; and transmitting, from the in-vehicle computing system over the secure communication channel and in response to confirming the authenticity of the coordination server, (i) the sensor data, (ii) the attestation quote, and (iii) a cryptographically-signed communication signed with a private key bound to the trusted execution environment of the in-vehicle computing system to the coordination server.

Example 14 includes the subject matter of Example 13, and wherein establishing the trusted execution environment comprises allocating a contiguous region of linear address space of a memory of the in-vehicle computing system for execution of a plurality of instructions that is protected from memory accesses originating from outside the contiguous region.

Example 15 includes the subject matter of any of Examples 13 and 14, and wherein establishing the secure communication channel comprises establishing a Secure Sockets Layer channel between the trusted execution environment of the in-vehicle computing system and the corresponding trusted execution environment of the coordination server.

Example 16 includes the subject matter of any of Examples 13-15, and wherein confirming the authenticity of the coordination server comprises receiving an attestation quote from the coordination server based on the corresponding trusted execution environment of the coordination server; and verifying the attestation quote.

Example 17 includes the subject matter of any of Examples 13-16, and wherein verifying the attestation quote comprises transmitting the attestation quote to an attestation server; and receiving, from the attestation server in response to transmitting the attestation quote, an attestation result indicating whether the trusted execution environment of the coordination server is secure.

Example 18 includes the subject matter of any of Examples 13-17, and wherein confirming the authenticity of the coordination server comprises verifying the integrity of code executing in the corresponding trusted execution environment of the coordination server.

Example 19 includes the subject matter of any of Examples 13-18, and wherein establishing the trusted execution environment comprises establishing a trusted execution environment on a security co-processor of the in-vehicle computing system; receiving the sensor data comprises receiving, by the trusted execution environment of the in-vehicle computing system, the sensor data through a hardware-protected input-output path between the security co-processor and the sensor; and the private key is bound to the security co-processor.

Example 20 includes the subject matter of any of Examples 13-19, and wherein the cryptographically-signed communication comprises at least one of the sensor data or the attestation quote.

Example 21 includes the subject matter of any of Examples 13-20, and further including receiving, by the in-vehicle computing system and over the secure communication channel, sensor data generated by a remote vehicle from the coordination server.

Example 22 includes the subject matter of any of Examples 13-21, and further including performing, by the in-vehicle computing system, an action based on the sensor data generated by the sensor of the vehicle and the sensor data generated by the remote vehicle.

Example 23 includes the subject matter of any of Examples 13-22, and further including provisioning the private key to the trusted execution environment.

Example 24 includes the subject matter of any of Examples 13-23, and wherein the private key is a private Enhanced Privacy Identification key corresponding with a public Enhanced Privacy Identification key accessible to the coordination server.

Example 25 includes a computing device comprising a processor; and a memory having stored therein a plurality of instructions that when executed by the processor cause the computing device to perform the method of any of Examples 13-24.

Example 26 includes one or more machine-readable storage media comprising a plurality of instructions stored thereon that, in response to execution by a computing device, cause the computing device to perform the method of any of Examples 13-24.

Example 27 includes an in-vehicle computing system of a vehicle for securely exchanging sensor information, the in-vehicle computing system comprising means for establishing a trusted execution environment on the in-vehicle computing system; means for establishing a secure communication channel between the trusted execution environment and a corresponding trusted execution environment of a coordination server; means for confirming, by the trusted execution environment, the authenticity of the coordination server; means for receiving, by the trusted execution environment, sensor data generated by a sensor of the vehicle; means for generating, by the trusted execution environment, an attestation quote based on the trusted execution environment of the in-vehicle computing system; and means for transmitting, over the secure communication channel and in response to confirmation of the authenticity of the coordination server, (i) the sensor data, (ii) the attestation quote, and (iii) a cryptographically-signed communication signed with a private key bound to the trusted execution environment of the in-vehicle computing system to the coordination server.

Example 28 includes the subject matter of Example 27, and wherein the means for establishing the trusted execution environment comprises means for allocating a contiguous region of linear address space of a memory of the in-vehicle computing system for execution of a plurality of instructions that is protected from memory accesses originating from outside the contiguous region.

Example 29 includes the subject matter of any of Examples 27 and 28, and wherein the means for establishing the secure communication channel comprises means for establishing a Secure Sockets Layer channel between the trusted execution environment of the in-vehicle computing system and the corresponding trusted execution environment of the coordination server.

Example 30 includes the subject matter of any of Examples 27-29, and wherein the means for confirming the authenticity of the coordination server comprises means for receiving an attestation quote from the coordination server based on the corresponding trusted execution environment of the coordination server; and means for verifying the attestation quote.

Example 31 includes the subject matter of any of Examples 27-30, and wherein the means for verifying the attestation quote comprises means for transmitting the attestation quote to an attestation server; and means for receiving, from the attestation server in response to transmittal of the attestation quote, an attestation result indicating whether the trusted execution environment of the coordination server is secure.

Example 32 includes the subject matter of any of Examples 27-31, and wherein the means for confirming the authenticity of the coordination server comprises means for verifying the integrity of code executing in the corresponding trusted execution environment of the coordination server.

Example 33 includes the subject matter of any of Examples 27-32, and wherein the means for establishing the trusted execution environment comprises means for establishing a trusted execution environment on a security co-processor of the in-vehicle computing system; the means for receiving the sensor data comprises means for receiving, by the trusted execution environment of the in-vehicle computing system, the sensor data through a hardware-protected input-output path between the security co-processor and the sensor; and the private key is bound to the security co-processor.

Example 34 includes the subject matter of any of Examples 27-33, and wherein the cryptographically-signed communication comprises at least one of the sensor data or the attestation quote.

Example 35 includes the subject matter of any of Examples 27-34, and further including means for receiving, over the secure communication channel, sensor data generated by a remote vehicle from the coordination server.

Example 36 includes the subject matter of any of Examples 27-35, and further including means for performing an action based on the sensor data generated by the sensor of the vehicle and the sensor data generated by the remote vehicle.

Example 37 includes the subject matter of any of Examples 27-36, and further including means for provisioning the private key to the trusted execution environment.

Example 38 includes the subject matter of any of Examples 27-37, and wherein the private key is a private Enhanced Privacy Identification key corresponding with a public Enhanced Privacy Identification key accessible to the coordination server.

Example 39 includes a local computing device for securely exchanging sensor information, the local computing device comprising a sensor to generate sensor data; a trusted execution environment module to establish a trusted execution environment on local computing device, wherein a private key is bound to the trusted execution environment; and a communication module to establish a secure communication channel between the trusted execution environment and a corresponding trusted execution environment of a coordination server; wherein the trusted execution environment module is further to (i) confirm the authenticity of the coordination server, (ii) receive the sensor data from the sensor, (iii) generate an attestation quote based on the trusted execution environment of the local computing device, and (iv) transmit, to the coordination server over the secure communication channel and by the communication module, the sensor data, the attestation quote, and cryptographically signed communication signed with the private key.

Example 40 includes the subject matter of Example 39, and wherein to establish the trusted execution environment comprises to allocate a contiguous region of linear address space of a memory of the local computing device for execution of a plurality of instructions that is protected from memory accesses originating from outside the contiguous region.

Example 41 includes the subject matter of any of Examples 39 and 40, and wherein to confirm the authenticity of the coordination server comprises to receive an attestation quote from the coordination server based on the corresponding trusted execution environment of the coordination server; and verify the attestation quote.

Example 42 includes the subject matter of any of Examples 39-41, and wherein the communication module is further to receive, from the coordination server, sensor data generated by a remote computing device; and the trusted execution environment module is further to perform an action based on the sensor data generated by the sensor of the local computing device and the sensor data generated by the remote computing device.

Example 43 includes the subject matter of any of Examples 39-42, and wherein the private key is a private Enhanced Privacy Identification key corresponding with a public Enhanced Privacy Identification key accessible to the coordination server.

Example 44 includes a method of securely exchanging sensor information by a local computing device, the method comprising establishing, by the local computing device, a trusted execution environment on the local computing device; establishing, by the local computing device, a secure communication channel between the trusted execution environment and a corresponding trusted execution environment of a coordination server; confirming, by the trusted execution environment, the authenticity of the coordination server; receiving, by the trusted execution environment, sensor data generated by a sensor of the local computing device; generating, by the trusted execution environment, an attestation quote based on the trusted execution environment of the local computing device; and transmitting, from the local computing device over the secure communication channel and in response to confirming the authenticity of the coordination server, (i) the sensor data, (ii) the attestation quote, and (iii) a cryptographically-signed communication signed with a private key bound to the trusted execution environment of the local computing device to the coordination server.

Example 45 includes the subject matter of Example 44, and wherein establishing the trusted execution environment comprises allocating a contiguous region of linear address space of a memory of the in-vehicle computing system for execution of a plurality of instructions that is protected from memory accesses originating from outside the contiguous region.

Example 46 includes the subject matter of any of Examples 44 and 45, and wherein confirming the authenticity of the coordination server comprises receiving an attestation quote from the coordination server based on the corresponding trusted execution environment of the coordination server; and verifying the attestation quote.

Example 47 includes the subject matter of any of Examples 44-46, and further including receiving, by the local computing device and from the coordination server, sensor data generated by a remote computing device; and performing, by the local computing device, an action based on the sensor data generated by the sensor of the local computing device and the sensor data generated by the remote computing device.

Example 48 includes the subject matter of any of Examples 44-47, and wherein the private key is a private Enhanced Privacy Identification key corresponding with a public Enhanced Privacy Identification key accessible to the coordination server.

Example 49 includes a computing device comprising a processor; and a memory having stored therein a plurality of instructions that when executed by the processor cause the computing device to perform the method of any of Examples 44-48.

Example 50 includes one or more machine-readable storage media comprising a plurality of instructions stored thereon that, in response to execution by a computing device, cause the computing device to perform the method of any of Examples 44-48.

Example 51 includes a local computing device for securely exchanging sensor information, the local computing device comprising means for establishing a trusted execution environment on the local computing device; means for establishing a secure communication channel between the trusted execution environment and a corresponding trusted execution environment of a coordination server; means for confirming, by the trusted execution environment, the authenticity of the coordination server; means for receiving, by the trusted execution environment, sensor data generated by a sensor of the local computing device; means for generating, by the trusted execution environment, an attestation quote based on the trusted execution environment of the local computing device; and means for transmitting, over the secure communication channel and in response to confirmation of the authenticity of the coordination server, (i) the sensor data, (ii) the attestation quote, and (iii) a cryptographically-signed communication signed with a private key bound to the trusted execution environment of the local computing device to the coordination server.

Example 52 includes the subject matter of Example 51, and wherein the means for establishing the trusted execution environment comprises means for allocating a contiguous region of linear address space of a memory of the in-vehicle computing system for execution of a plurality of instructions that is protected from memory accesses originating from outside the contiguous region.

Example 53 includes the subject matter of any of Examples 51 and 52, and wherein the means for confirming the authenticity of the coordination server comprises means for receiving an attestation quote from the coordination server based on the corresponding trusted execution environment of the coordination server; and means for verifying the attestation quote.

Example 54 includes the subject matter of any of Examples 51-53, and further including means for receiving, from the coordination server, sensor data generated by a remote computing device; and means for performing an action based on the sensor data generated by the sensor of the local computing device and the sensor data generated by the remote computing device.

Example 55 includes the subject matter of any of Examples 51-54, and wherein the private key is a private Enhanced Privacy Identification key corresponding with a public Enhanced Privacy Identification key accessible to the coordination server.

Example 56 includes a coordination server for coordinating the secure exchange of sensor information between vehicles, the coordination server comprising a trusted execution environment module to (i) establish a trusted execution environment on the coordination server and (ii) generate a server attestation quote based on the trusted execution environment of the coordination server; a communication module to (i) establish a secure communication channel between the trusted execution environment and a corresponding trusted execution environment of an in-vehicle computing system of a vehicle, (ii) transmit, over the secure communication channel, the server attestation quote to the in-vehicle computing system, and (iii) receive, from the in-vehicle computing system over the secure communication channel, sensor data generated by a sensor of the vehicle, a vehicle attestation quote based on the corresponding trusted execution environment of the in-vehicle computing system, and a cryptographically-signed communication signed with a private key bound to the trusted execution environment of the in-vehicle computing system; wherein the trusted execution environment module is further to verify (i) the vehicle attestation quote, (ii) the private key associated with the cryptographically-signed communication, and (iii) a revocation status of the private key; and a sensor data processing module to process the sensor data in response to verification of the vehicle attestation quote and the private key and a determination that the private key has not been revoked.

Example 57 includes the subject matter of Example 56, and wherein to process the sensor data comprises to transmit the sensor data to a second in-vehicle computing system of a remote vehicle.

Example 58 includes the subject matter of any of Examples 56 and 57, and wherein to verify the vehicle attestation quote comprises to transmit the vehicle attestation quote to an attestation server; and receive, from the attestation server in response to transmittal of the vehicle attestation quote, an attestation result indicating whether the trusted execution environment of the in-vehicle computing system is secure.

Example 59 includes the subject matter of any of Examples 56-58, and wherein the private key is a private Enhanced Privacy Identification key corresponding with a public Enhanced Privacy Identification key accessible to the coordination server; and wherein to verify the private key comprises to apply the public Enhanced Privacy Identification key to the cryptographically-signed communication.

Example 60 includes the subject matter of any of Examples 56-59, and wherein to verify the revocation status of the private key comprises to compare the private key to a revocation list of a manufacturer server.

Example 61 includes the subject matter of any of Examples 56-60, and wherein to establish the trusted execution environment comprises to allocate a contiguous region of linear address space of a memory of the coordination server for execution of a plurality of instructions that is protected from memory accesses originating from outside the contiguous region.

Example 62 includes a method of coordinating the secure exchange of sensor information between vehicles by a coordination server, the method comprising establishing, by the coordination server, a trusted execution environment on the coordination server; establishing, by the coordination server, a secure communication channel between the trusted execution environment and a corresponding trusted execution environment of an in-vehicle computing system of a vehicle; generating, by the coordination server, a server attestation quote based on the trusted execution environment of the coordination server; transmitting, by the coordination server and over the secure communication channel, the server attestation quote to the in-vehicle computing system; receiving, by the coordination server and from the in-vehicle computing system over the secure communication channel, (i) sensor data generated by a sensor of the vehicle, (ii) a vehicle attestation quote based on the corresponding trusted execution environment of the in-vehicle computing system, and (iii) a cryptographically-signed communication signed with a private key bound to the trusted execution environment of the in-vehicle computing system; verifying, by the coordination server, (i) the vehicle attestation quote, (ii) the private key associated with the cryptographically-signed communication, and (iii) a revocation status of the private key; and processing, by the coordination server, the sensor data in response to verification of the vehicle attestation quote and the private key and a determination that the private key has not been revoked.

Example 63 includes the subject matter of Example 62, and wherein processing the sensor data comprises transmitting the sensor data to a second in-vehicle computing system of a remote vehicle.

Example 64 includes the subject matter of any of Examples 62 and 63, and wherein verifying the vehicle attestation quote comprises transmitting the vehicle attestation quote to an attestation server; and receiving, from the attestation server in response to transmitting the vehicle attestation quote, an attestation result indicating whether the trusted execution environment of the in-vehicle computing system is secure.

Example 65 includes the subject matter of any of Examples 62-64, and wherein the private key is a private Enhanced Privacy Identification key corresponding with a public Enhanced Privacy Identification key accessible to the coordination server; and wherein verifying the private key comprises applying the public Enhanced Privacy Identification key to the cryptographically-signed communication.

Example 66 includes the subject matter of any of Examples 62-65, and wherein verifying the revocation status of the private key comprises comparing the private key to a revocation list of a manufacturer server.

Example 67 includes the subject matter of any of Examples 62-66, and wherein establishing the trusted execution environment comprises allocating a contiguous region of linear address space of a memory of the coordination server for execution of a plurality of instructions that is protected from memory accesses originating from outside the contiguous region.

Example 68 includes a computing device comprising a processor; and a memory having stored therein a plurality of instructions that when executed by the processor cause the computing device to perform the method of any of Examples 62-67.

Example 69 includes one or more machine-readable storage media comprising a plurality of instructions stored thereon that, in response to execution by a computing device, cause the computing device to perform the method of any of Examples 62-67.

Example 70 includes a coordination server for coordinating the secure exchange of sensor information between vehicles, the coordination server comprising means for establishing a trusted execution environment on the coordination server; means for establishing a secure communication channel between the trusted execution environment and a corresponding trusted execution environment of an in-vehicle computing system of a vehicle; means for generating a. server attestation quote based on the trusted execution environment of the coordination server; means for transmitting, over the secure communication channel, the server attestation quote to the in-vehicle computing system; means for receiving, from the in-vehicle computing system over the secure communication channel, (i) sensor data generated by a sensor of the vehicle, (ii) a vehicle attestation quote based on the corresponding trusted execution environment of the in-vehicle computing system, and (iii) a cryptographically-signed communication signed with a private key bound to the trusted execution environment of the in-vehicle computing system; means for verifying (i) the vehicle attestation quote, (ii) the private key associated with the cryptographically-signed communication, and (iii) a revocation status of the private key; and means for processing the sensor data in response to verification of the vehicle attestation quote and the private key and a determination that the private key has not been revoked.

Example 71 includes the subject matter of Example 70, and wherein the means for processing the sensor data comprises means for transmitting the sensor data to a second in-vehicle computing system of a remote vehicle.

Example 72 includes the subject matter of any of Examples 70 and 71, and wherein the means for verifying the vehicle attestation quote comprises means for transmitting the vehicle attestation quote to an attestation server; and means for receiving, from the attestation server in response to transmitting the vehicle attestation quote, an attestation result indicating whether the trusted execution environment of the in-vehicle computing system is secure.

Example 73 includes the subject matter of any of Examples 70-72, and wherein the private key is a private Enhanced Privacy Identification key corresponding with a public Enhanced Privacy Identification key accessible to the coordination server; and wherein the means for verifying the private key comprises means for applying the public Enhanced Privacy Identification key to the cryptographically-signed communication.

Example 74 includes the subject matter of any of Examples 70-73, and wherein the means for verifying the revocation status of the private key comprises means for comparing the private key to a revocation list of a manufacturer server.

Example 75 includes the subject matter of any of Examples 70-74, and wherein the means for establishing the trusted execution environment comprises means for allocating a contiguous region of linear address space of a memory of the coordination server for execution of a plurality of instructions that is protected from memory accesses originating from outside the contiguous region.

The invention claimed is:

1. An in-vehicle computing system of a vehicle for securely exchanging sensor information, the in-vehicle computing system comprising:
a sensor to generate sensor data;
a trusted execution environment module to establish a trusted execution environment on the in-vehicle computing system, wherein a private key is bound to the trusted execution environment of the in-vehicle computing system; and
a communication module to establish a secure communication channel between the trusted execution environment of the in-vehicle computing system and a corresponding trusted execution environment of a coordination server via a network;
wherein the trusted execution environment module is further configured to (i) confirm an authenticity of the coordination server, (ii) receive the sensor data from the sensor, (iii) generate, in response to the authentication of the coordination server, a vehicle attestation quote based on the trusted execution environment of the in-vehicle computing system, wherein the vehicle attestation quote indicates an integrity of the sensor data, (iv) transmit, to the coordination server over the secure communication channel via the network and by the communication module, the sensor data, the vehicle attestation quote for verification by the coordination server, and a cryptographically-signed communication signed with the private key, (v) receive, from the coordination server and in response to a verification of the vehicle attestation quote and the cryptographically-signed communication by the coordination server, sensor data generated by a remote vehicle, and (vi) perform, in response to authentication of the coordination server, a protection action against malicious actions based on the sensor data generated by the sensor of the vehicle and the sensor data generated by the remote vehicle;
wherein to confirm the authenticity of the coordination server comprises to (vii) receive a server attestation quote from the coordination server based on the corresponding trusted execution environment of the coordination server, (viii) determine whether the server attestation quote is verified, and (ix) perform, in response to a determination that a verification of the server attestation quote was unsuccessful, an error-handling procedure.

2. The in-vehicle computing system of claim 1, wherein to establish the trusted execution environment comprises to allocate a contiguous region of linear address space of a memory of the in-vehicle computing system for execution of a plurality of instructions that is protected from memory accesses originating from outside the contiguous region.

3. The in-vehicle computing system of claim 1, wherein to establish the secure communication channel comprises to establish a Secure Sockets Layer channel between the trusted execution environment of the in-vehicle computing system and the corresponding trusted execution environment of the coordination server.

4. The in-vehicle computing system of claim 1, wherein to verify the server attestation quote comprises to (i) transmit the server attestation quote to an attestation server and (ii) receive, from the attestation server in response to transmittal of the server attestation quote, an attestation result indicating whether the trusted execution environment of the coordination server is secure.

5. The in-vehicle computing system of claim 1, wherein to confirm the authenticity of the coordination server comprises to verify an integrity of code executing in the corresponding trusted execution environment of the coordination server.

6. The in-vehicle computing system of claim 1, further comprising a main processor and a security co-processor different from the main processor,
wherein to establish the trusted execution environment comprises to establish a trusted execution environment on the security co-processor of the in-vehicle computing system;
wherein to receive the sensor data comprises to receive, by the trusted execution environment of the in-vehicle computing system, the sensor data through a hardware-protected input-output path between the security co-processor and the sensor; and
wherein the private key is bound to the security co-processor.

7. The in-vehicle computing system of claim 1, wherein the private key is a private Enhanced Privacy Identification key corresponding with a public Enhanced Privacy Identification key accessible to the coordination server.

8. One or more non-transitory, machine-readable storage media comprising a plurality of instructions stored thereon that, in response to execution by an in-vehicle computing system, cause the in-vehicle computing system to:
establish a trusted execution environment on the in-vehicle computing system;
establish a secure communication channel between the trusted execution environment of the in-vehicle computing system and a corresponding trusted execution environment of a coordination server via a network;
confirm, by the trusted execution environment of the in-vehicle computing system, an authenticity of the coordination server;
receive, by the trusted execution environment of the in-vehicle computing system, sensor data generated by a sensor of the vehicle;
generate, in response to an authentication of the coordination server and by the trusted execution environment of the in-vehicle computing system, a vehicle attestation quote based on the trusted execution environment of the in-vehicle computing system;
transmit, over the secure communication channel via the network and in response to confirmation of the authenticity of the coordination server, (i) the sensor data, (ii) the vehicle attestation quote, and (iii) a cryptographically-signed communication signed with a private key bound to the trusted execution environment of the in-vehicle computing system to the coordination server;
receive, from the coordination server and in response to a verification of the vehicle attestation quote and the cryptographically-signed communication by the coordination server, sensor data generated by a remote vehicle; and
perform, in response to authentication of the coordination server, a protection action against malicious actions based on the sensor data generated by the sensor of the vehicle and the sensor data generated by the remote vehicle;
wherein to confirm the authenticity of the coordination server comprises to (iv) receive a server attestation quote from the coordination server based on the corresponding trusted execution environment of the coordination server, (v) determine whether the server attestation quote is verified, and (vi) perform, in response to a determination that a verification of the server attestation quote was unsuccessful, an error-handling procedure.

9. The one or more non-transitory, machine-readable storage media of claim 8, wherein to establish the trusted execution environment comprises to allocate a contiguous region of linear address space of a memory of the in-vehicle computing system for execution of a plurality of instructions that is protected from memory accesses originating from outside the contiguous region.

10. The one or more non-transitory, machine-readable storage media of claim 8,
wherein to verify the server attestation quote comprises to (i) transmit the server attestation quote to an attestation server and (ii) receive, from the attestation server in response to transmitting the server attestation quote, an attestation result indicating whether the trusted execution environment of the coordination server is secure.

11. The one or more non-transitory, machine-readable storage media of claim 8, wherein to confirm the authenticity of the coordination server comprises to verify an integrity of code executing in the corresponding trusted execution environment of the coordination server.

12. The one or more non-transitory, machine-readable storage media of claim 8, wherein to:
establish the trusted execution environment comprises to establish a trusted execution environment on a security co-processor of the in-vehicle computing system;
receive the sensor data comprises to receive, by the trusted execution environment of the in-vehicle computing system, the sensor data through a hardware-protected input-output path between the security co-processor and the sensor; and
the private key is bound to the security co-processor.

13. The one or more non-transitory, machine-readable storage media of claim 8, wherein the private key is a private Enhanced Privacy Identification key corresponding with a public Enhanced Privacy Identification key accessible to the coordination server.

14. A coordination server for coordinating the secure exchange of sensor information between vehicles, the coordination server comprising:
a trusted execution environment module to (i) establish a trusted execution environment on the coordination server and (ii) generate a server attestation quote based on the trusted execution environment of the coordination server;
a communication module to (i) establish a secure communication channel between the trusted execution environment of the coordination server and a corresponding trusted execution environment of an in-vehicle computing system of a vehicle via a network, (ii) transmit, over the secure communication channel via the network, the server attestation quote to the in-vehicle computing system, and (iii) receive, from the in-vehicle computing system over the secure communication channel and in response to a verification of the server attestation quote by the in-vehicle computing system, sensor data generated by a sensor of the vehicle, a vehicle attestation quote based on the corresponding trusted execution environment of the in-vehicle computing system, and a cryptographically-signed communication signed with a private key bound to the trusted execution environment of the in-vehicle computing system;

wherein the trusted execution environment module is further configured to determine whether the vehicle attestation quote, the private key associated with the cryptographically-signed communication, and a revocation status of the private key are verified and perform, in response to a determination that a verification of at least one of the vehicle attestation quote, the private key, and the revocation status of the private key was unsuccessful, an error-handling procedure; and a sensor data processing module to process the sensor data in response to verification of the vehicle attestation quote and the private key and a determination that the private key has not been revoked.

15. The coordination server of claim 14, wherein to process the sensor data comprises to transmit the sensor data to a second in-vehicle computing system of a remote vehicle.

16. The coordination server of claim 14, wherein to verify the vehicle attestation quote comprises to:

transmit the vehicle attestation quote to an attestation server; and receive, from the attestation server in response to transmittal of the vehicle attestation quote, an attestation result indicating whether the trusted execution environment of the in-vehicle computing system is secure.

17. The coordination server of claim 14, wherein the private key is a private Enhanced Privacy Identification key corresponding with a public Enhanced Privacy Identification key accessible to the coordination server; and wherein to verify the private key comprises to apply the public Enhanced Privacy Identification key to the cryptographically-signed communication.

18. The coordination server of claim 14, wherein to verify the revocation status of the private key comprises to compare the private key to a revocation list of a manufacturer server.

19. The local computing device of claim 14, wherein to establish the trusted execution environment comprises to allocate a contiguous region of linear address space of a memory of the coordination server for execution of a plurality of instructions that is protected from memory accesses originating from outside the contiguous region.

20. A local computing device for securely exchanging sensor information, the local computing device comprising:

a sensor to generate sensor data;

a trusted execution environment module to establish a trusted execution environment on local computing device, wherein a private key is bound to the trusted execution environment; and a communication module to establish a secure communication channel between the trusted execution environment of the local computing device and a corresponding trusted execution environment of a coordination server via a network;

wherein the trusted execution environment module is further configured to (i) confirm an authenticity of the coordination server, (ii) receive the sensor data from the sensor, (iii) generate, in response to an authentication of the coordination server, an attestation quote based on the trusted execution environment of the local computing device, (iv) transmit, to the coordination server over the secure communication channel via the network and by the communication module, the sensor data, the attestation quote, and cryptographically signed communication signed with the private key, (v) receive, from the coordination server and in response to a verification of the vehicle attestation quote and the cryptographically-signed communication by the coordination server, sensor data generated by a remote vehicle, and (vi) perform, in response to authentication of the coordination server, a protection action against malicious actions based on the sensor data generated by the sensor of the vehicle and the sensor data generated by the remote vehicle;

wherein to confirm the authenticity of the coordination server comprises to (vii) receive a server attestation quote from the coordination server based on the corresponding trusted execution environment of the coordination server, (viii) determine whether the server attestation quote is verified, and (ix) perform, in response to a determination that a verification of the server attestation quote was unsuccessful, an error-handling procedure.

21. The local computing device of claim 20, wherein to establish the trusted execution environment comprises to allocate a contiguous region of linear address space of a memory of the local computing device for execution of a plurality of instructions that is protected from memory accesses originating from outside the contiguous region.

* * * * *